United States Patent [19]

Rössler et al.

[11] Patent Number: 4,606,937

[45] Date of Patent: Aug. 19, 1986

[54] ELECTROEROSION RECORDING MEDIUM FABRICATION METHOD

[75] Inventors: Manfred Rössler, Stuttgart; Gerhard Winter, Remshalden; Hermann Stiltz, Stuttgart, all of Fed. Rep. of Germany

[73] Assignee: Robert Bosch GmbH, Stuttgart, Fed. Rep. of Germany

[21] Appl. No.: 705,388

[22] PCT Filed: Jul. 24, 1984

[86] PCT No.: PCT/DE84/00157

§ 371 Date: Jan. 30, 1985

§ 102(e) Date: Jan. 30, 1985

[87] PCT Pub. No.: WO85/01019

PCT Pub. Date: Mar. 14, 1985

[30] Foreign Application Priority Data

Aug. 19, 1983 [DE] Fed. Rep. of Germany ....... 3329981

[51] Int. Cl.4 .......................... B05D 5/12; B32B 5/16; G03C 1/76; G01D 15/34

[52] U.S. Cl. ................................ 427/121; 346/135.1; 427/123; 427/190; 427/250; 427/404; 427/419.8; 428/323; 428/326; 428/327; 428/328; 428/913; 430/195; 430/495; 430/523; 430/524; 430/526; 430/902; 430/935; 430/961

[58] Field of Search ................. 430/49, 961, 195, 495, 430/523, 524, 526, 902, 935; 427/121, 123, 190, 250, 404, 419.8; 346/135.1; 428/326, 327, 328, 323, 913

[56] References Cited

U.S. PATENT DOCUMENTS 4,339,758 7/1982 Bhatia et al. ........................ 346/1.1
4,359,484 12/1982 Bahr et al. ..................... 427/14.1 X
4,403,224 9/1983 Wirnowski .......................... 346/1.1
4,423,132 12/1983 Kondo et al. ..................... 430/67 X
4,438,170 3/1984 McCue ........................... 428/207 X
4,483,902 11/1984 Bahr et al. ...................... 428/330 X

FOREIGN PATENT DOCUMENTS 35105 9/1981 European Pat. Off. .
50704 5/1982 European Pat. Off. .
50716 5/1982 European Pat. Off. .
62803 10/1982 European Pat. Off. .

*Primary Examiner*—E. A. Goldberg
*Assistant Examiner*—Gerald E. Preston
*Attorney, Agent, or Firm*—Michael J. Striker

[57] ABSTRACT

A track recording support for recording devices is suggested with a support (10) made of paper or plastic on which a metallic coating (12) is mounted by means of evaporation and being able to be burned off by means of recording electrodes, in particular an aluminum coating. A lubricant in a finely dispersed form is added to contrast coating (11) for reducing of scratching and grinding traces on the surface of metal coating (12) which reaches metal coating (12) and the freely exposed surface thereof by means of diffusion. Preferably, the lubricant is fed to the contrast substance in a powdery form before the processing of the same. On the one hand, it acts in a physical point of view by a reduction of the slide friction on the surface and, on the other hand, in a chemical point of view in that it substantially prevents the build up of combustion residues from the contrast layer on the recording electrodes.

8 Claims, 1 Drawing Figure

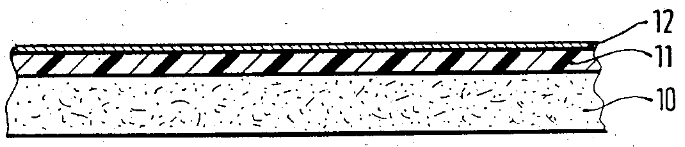
12
11
10

ELECTROEROSION RECORDING MEDIUM FABRICATION METHOD

STATE OF THE ART

The invention is based on a recording device in accordance with the type of the main claim. Such a recording device is known from DE-OS 30 17 450, for example, whereby aluminum is applied as a metal coating to a tape like support. The metal coating is provided with a lubricant coating on its surface for reducing the scratching traces and grinding traces, whereby the lubricant may consist of a metal soap, among others. The lubricant coating is applied on the metal coating as a further coating after finishing the actual recording support made of a support consisting of a contrast coating and the metallisation which is applied to the surface of the metal coating as a further coating. This type of manufacturing requires an additional operating step for applying the lubricant coating, on the one hand, while this lubricant may cause a contamination of the recording electrode and the mass contact of the recording device during the recording process, on the other hand, which may result in a clear impairment of the recording quality as well as in undesirable burn offs on the mass contact.

Furthermore, a process for generating a lubricant coating on a recording device which is coated with aluminum on the surface of a recording support is described in DE-OS 30 40 485, whereby an additive of one or a plurality of fatty acids is admixed to a coating of the rear side of the support with one or a plurality of nitro lacquer coatings which react with the aluminum layer during an extended aging process and partially transfers it into an aluminum soap, after the recording support is wound into a roll. This process is very expensive, on the one hand, and can be used only in conjunction with lacquering the rear side of the recording support, on the other hand, a similar coating is obtained as described before when applying a lubricant to the surface of the metal coating which does not have the desired characteristics in a sufficient manner.

ADVANTAGES OF THE INVENTION

The recording support for recording devices with the characterizing features of the main claim is advantageous with respect to the described state of the art in that the desired effect of the grinding and scratching trace reduction is obtained without any additional operating step when making the recording support and with a higher degree of efficiency. The lubricant used may be added to the substance constituting the contrast coating when making the recording support, whereby as a contrast substance lacquer and printing inks are particularly suitable. The relatively easily liquefiable ethyl acetate is contained as a solvent in lacquer in a predominant manner, while a more slower drying process is desired in the printing inks, so that butyl acetate is used in an increased manner as a solvent. Printing inks, in particular printing inks which are usable for photo-gravure printing are usually more rich in filler material than lacquer, however basic differences between the two customarily used contrast substances do not exist.

The increase of the grinding and scratching tracer resistancy in accordance with the recording support in accordance with the invention is obtained by embedding the lubricant into the evaporated metal layer by means of a diffusion process. The danger of contamination of the recording electrode and the mass contact is substantially reduced since only low amounts of the lubricant is available on the surface of the metal coating. However, these low amounts suffice for obtaining the desired required slide and separating effect on the surface of the metal layer, whereby tests have shown that the wear of the electrodes is also substantially reduced. Furthermore, the lubricant which is present in the contrast coating becomes chemically effective during the burn off process and prevents or reduces the formation of combustion ewsidues on the recording electrodes in view of the chemical reactions, which also result in impairing the recording quality on account of the sharp edged tips which result in mechanical grinding and scratching tracers on the metal surface.

The effect of known lubricants is limited to fight grinding the scratching traces on undamaged metal layer by the engagement of the electrodes. In contrast thereto, the solution in accordance with the invention additionally achieves to fight the grinding and scratching traces which occur during the burn off process of the metal layer and result in a contamination of the electrodes. The lubricant which had been introduced into the contrast coating is maintained in the contrast coating, in the one hand, and reaches the metal surface and the free surface of the metal coating by means of diffusion, on the other hand. In addition to the physical effect in the sense of an increase in the slide-ability on the surface, the lubricant is also chemically effective whithin the coatings, in that it fights procesesses which result in an increased contamination of the electrodes during the burn off process and consequently result in an increased amount of grinding traces and scratching traces. Therefore, in addition to reducing the grinding traces by the sliding effect the cause of the grinding traces is fought in particular.

Advantageous further embodiments and improvements of the recording support mentioned in the main claim are made possible by the measures stated in the subclaims. In particular, it should be emphasized that metal soap is used as a lubricant which resulted in particular good results. In particular, Al-tristearate and Zn-12-hydroxylaurate were found to be particulary advantageous as a lubricant among the metal soaps. Other lubricants for the purpose stated would be, for example, powder like, paste like or liquid waxes, fatty acid ester and/or silicon compositions or modified silicon resins.

Metal soaps are not only good lubricants but also have good separating characteristics and therefore considerably reduce the adhering of combustion residues and particles which were removed from the lacquer surface on the electrode which comes into contact with the lacquer surface in the hot stage. Metal soaps are also advantageous in accordance with the inventive lubricants because they are compatible with the customary lacquers or printing inks and can therefore be easily processed. Within the contrast substance they also tend not to deposit the remainder of the pigments, but rather reduce the tendency of depositing in the contrast substance.

Particularly good results were obtained with a contrast coating made of a lacquer coating on the basis of cellulose esters with ethyl acetate and/or butyl acetate as a solvent to which a metal soap in a finely dispersed powdery form is admixed in the liquid state thereof. The inking of the contrast coating may be done with soot, however better results were obtained with the lubricants in accordance with the invention in conjunction with soluble inks. A dull surface of the contrast coating which also contributes to a dull surface of the superimposed metal coating is preferably obtained by adding colorless pigments, in particular infusorial earth. Other colorless dulling substances would be preferably calcium carbonate or amorpheous silica. Further advantageous embodiments of the invention are the result from the remainder of the subclaims and the description of the exemplified embodiments.

DRAWING

The principal structure of a recording support, in accordance with the invention, for recording devices is schematically illustrated in the drawings and explained in detail in the following description.

DESCRIPTION OF THE EXEMPLIFIED EMBODIMENT

The FIGURE illustrates a recording support for recording devices in form of a tape which supports a contrast coating 11 on a support 10 and mounted thereon a metallic coating which may be burned off by one or a plurality of electrodes. Preferably an aluminum coating is suitable as the metal coating, however a zinc-cadmium coating may be used instead. The support 10 preferably consits of a paper web, however one also may consider a plastic foil as a support. The contrast coating 11 which contains at least one polar solvent consists preferably of a lacquer which is applied by means of a doctor roller or roller lacquering process. Instead of a lacquer a printing ink may serve as the contrast coating, which is preferably applied in the low pressure process. The metal coating 12, in particular an aluminum coating is evaporated in a vacuum onto the contrast coating 11 in a thickness of about 0.01 to 0.0 μm, preferably in a thickness in the range of the lower limit of 0.01 μm. The contrast coating 11 consists of a lacquer in a thickness of 1 to 5 μm, preferably in a thickness of 3 μm and is applied in the roller lacquer process onto a paper tape with a thickness of between 60 and 100 μm, preferably of 60 μm. The thickness ratios visible in the drawing serve to merely explain the principal structure of the recording support and does not correspond to the actual rhickness ratios of the different coatings.

The nature of the invention consists in that the finished lubricant, in particular a metal soap in powder form, should be added to the contrast coating in a finely dispersed manner, instead of an aftermaking of a separate surface-lubricate coating on the metal coating. The lubricant partially remains in the contrast coating, wile another part enters the metal coating by means of diffusion and thereby to the surface of the metal coating. Thus, one obtains the double effect of the lubricant in a physical view by increasing the slideability, on the one hand, and in the chemical view, on the other hand, in that it prevents deposits which are usually generated on the electrode during the burn off operation. In addition to metal soaps as lubricants siloxan combinations are suitable as well as polyethylene waxes and silicon oils, which may also be added to the contrast substance in a liquid form.

The recording supports in according with the invention preferably use lacquer systems as contrast coatings on the basis of cellulose esters like, for example, on the basis of cellulose acetobutyrate which are pigmented with infusorial earth for obtaining a dull surface and for improving the recording characteristics. Good results were obtained with 3 to 10% by weight infusorial earth as a dulling substance with solid body contents of a total of 10 to 23% by weight. In this recording supports a constituent of lubricant is added to the contrast coating 11 of 0.1 to 5% by weight, preferably of 0.5 to 1.5% by weight of a metal soap, whereby the constituents are in a ratio to the wet weight of the contrast substance. Preferably, neutrally reacting metal soaps are used as a lubricant, in particular soaps of the metal Al, Zn, Mg and Ca. In addition soaps of saturated as well as unsaturated fatty acids are considered.

The two following compositions brought especially good results: A first exemplified embodiment contained a lacquer on a support 10 made from paper as a contrast coating 11 which contained with respect to the liquid stage 10% by weight cellulose acetobutyrate, 5.5% by weight infusorial earth as a dulling substance, 2% by weight soluble dye and 1.5% by weight Al-tristearate as a lubricant. In another exemplified embodiment especially good results were obtained with an arrangement consisting of a support 10 made from paper, whose contrast coating 11 also consisted of a lacquer coating with 10% by weight cellulose acetobutyrate (CAB) as a binder, 7.5% be weight infusorial earth as a dulling substance.again 2% by weight soluble dye and 1% by weight Zn-hydroxylaurate as a lubricant.

I claim:

1. A method of making a record carrier comprising the steps of:

mixing a fine particulate metal-soap lubricant with a liquid coating material including a polar solvent;

coating a paper substrate with the liquid material mixed with the lubricant and curing it thereon to form a contrast layer on the substrate; and vapor depositing a metallic layer on the coating thin enough for the metal-soap lubricant to diffuse through.

2. The method defined in claim 1 wherein the fine particulate metal-soap lubricant is particulate aluminum tristearate or particulate zinc hydroxylaurate.

3. The method defined in claim 1 wherein the lubricant is mixed with the coating material at 0.1% by weight to 5% by weight.

4. The method defined in claim 1 wherein the lubricant is mixed with the coating material at 0.5% by weight to 1.5% by weight.

5. The method defined in claim 1, further comprising the step of admixing diatomaceous earth with the liquid coating material prior to coating the substrate with it.

6. The method defined in claim 5 wherein the diatomaceous earth is mixed with the coating material at 3% by weight to 5% by weight, imparting to the mixture a total solids content of between 10% by weight and 23% by weight.

7. The method defined in claim 1 wherein the coating comprises by weight:

about 10% cellulose acetobutyrate as binder,
about 5.5% diatomaceous earth as matting agent,
about 2% soluble dye, and
about 1.5% aluminum tristearate as lubricant.

8. The method defined in claim 1 wherein the coating comprises by weight:

about 10% cellulose acetobutyrate as binder,
about 7.5% diatomaceous earth as matting agent,
about 2% soluble dye, and
about 1% zinc-12-hydroxylaurate as lubricant.

* * * * *